(12) United States Patent
Koda et al.

(10) Patent No.: US 7,410,692 B2
(45) Date of Patent: Aug. 12, 2008

(54) COATED FILM

(75) Inventors: Toshihiro Koda, Sakata-gun (JP); Masato Fujita, Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 10/218,399

(22) Filed: Aug. 14, 2002

(65) Prior Publication Data

US 2003/0104216 A1    Jun. 5, 2003

(30) Foreign Application Priority Data

Aug. 16, 2001    (JP)    ............................. 2001-247171

(51) Int. Cl.
G11B 5/64    (2006.01)
B32B 17/10    (2006.01)
C08J 7/04    (2006.01)

(52) U.S. Cl. ........................ 428/336; 428/339; 428/341

(58) Field of Classification Search ............. 428/423.1, 428/423.7, 336, 339, 423.2, 480, 341, 482, 428/483

See application file for complete search history.

(56) References Cited

U.S. PATENT DOCUMENTS

| | | | | |
|---|---|---|---|---|
| 4,252,885 A | * | 2/1981 | McGrail et al. | ............. 430/160 |
| 4,304,851 A | * | 12/1981 | McGrail et al. | ............. 430/533 |
| 5,916,675 A | * | 6/1999 | Komoto et al. | .......... 428/355 R |
| 5,932,320 A | * | 8/1999 | Okajima et al. | .......... 428/195.1 |
| 5,958,659 A | * | 9/1999 | Takahashi | .................... 430/533 |
| 6,096,410 A | * | 8/2000 | Okajima et al. | .......... 428/195.1 |
| 6,403,224 B1 | * | 6/2002 | Okajima et al. | .......... 428/423.7 |
| 6,428,856 B1 | * | 8/2002 | Masuda et al. | ............ 427/412.3 |

FOREIGN PATENT DOCUMENTS

EP    0 342 826 A2    11/1989
EP    0 731 130 A1    9/1996

OTHER PUBLICATIONS

Database WPI, Section Ch, Week 198228 Derwent Publications Ltd., London, GB; AN 1982-58165E, XP-002260329 & JP 57 090022 A (Dainippon Printing Co., Ltd.), Jun. 4, 1982; Abstract.
Data bsae WPI, Section Ch, Week 198527 Derwent Publications Ltd., London, GB; AN 1985-162546, XP-002260328 & JP 60 093431 A (Ricoh KK), May 25, 1985; Abstract.
Data base WPI, Section Ch, Week 199509 Derwent Publications Ltd., London, GB; AN 1995-063621, XP-002260327 & JP 06 340049 A (Unitika Ltd.), Dec 13, 1994; Abstract.
A Nov. 28, 2003 European Search Report that was issued in connection with counterpart European patent application No. 02018082.4.

* cited by examiner

*Primary Examiner*—Thao Tran
(74) *Attorney, Agent, or Firm*—Edwards Angell Palmer & Dodge LLP; David G. Conlin; Lisa Swiszcz Hazzard

(57) ABSTRACT

The present invention relates to a coated film comprising a polyester film and a coating layer provided on one side thereof, which coating layer is formed by applying a coating solution containing at least one binder resin (A), a polycarbodiimide compound (B) and a melamine compound (C).

6 Claims, No Drawings

COATED FILM

BACKGROUND OF THE INVENTION

The present invention relates to a coated film. More particularly, it relates to a film having a novel coating layer with high transparency and surface gross, anti-blocking property and strong adherence to various facing materials.

Since a stretched polyester film has many excellent properties such as high mechanical strength, dimensional stability, planarity, smoothness, heat resistance, chemical resistance and transparency, it is used in wide variety applications, such as base film for magnetic recording media, packaging material, platemaking film, base for magnetic cards, and base for synthetic paper.

However, as its surface has high-degree crystalline orientation, the polyester film has the disadvantage of being low in adherence to inks, various types of coatings and facing materials.

As a solution to the problem of such low adherence, it has been proposed to apply various types of resin on the polyester film surface to provide an easily adhering coating layer. Especially a method in which such coating is carried out in the film production process (in-line coating) prevails for its economical advantage and its capability to provide the good film properties. In a typical instance of this method, coating is conducted at a point after stretching in the machine direction and before stretching in the transverse direction, and then stretching in the transverse direction and heat setting are performed.

In case where a coating layer is provided by using an easily adhering resin as said above, there tends to occur so-called "blocking", a phenomenon of the films to stick to each other. Also, sufficient adhesion to the facing may not be obtained by merely providing a coating layer with such an easily adhering resin.

Incorporation of a crosslinking agent as a component of the coating layer has been proposed as a method for reducing the blocking tendency of the film and improving its adhesiveness. However, addition of a crosslinking agent in the coating layer composition usually prompts hardening of the formed coating layer, so that in case where stretching is carried out after coating as in the in-line coating system, the coating layer may be unable to follow stretching to cause fine cracks in the layer surface, giving rise to the problems such as improper adhesion to the facing and clouding of the coating layer due to scattering of light. Even when the base film is not transparent, there can arise the problem of reduced surface gloss.

SUMMARY OF THE INVENTION

The object of the present invention is to provide a polyester film having excellent anti-blocking property, strong adhesiveness to various facing materials as well as high transparency and surface gross.

As a result of the present inventors' earnest studies to attain the above object, it has been found that the above problems can be solved by providing a coating layer comprising a combination of specific compounds.

The present invention has been attained on the basis of the above finding and accordingly, in an aspect of the present invention, there is provided a coated film comprising a polyester film and a coating layer provided on one side thereof, which coating layer is formed by applying a coating solution containing at least one binder resin (A), a polycarbodiimide compound (B) and a melamine compound (C).

DETAILED DESCRIPTION OF THE INVENTION

A detailed description of the present invention follows.

The coated film according to the present invention comprises a base film and a coating layer. As the base film, polyester film is used.

The polyesters preferred for use in the base film of present invention are those obtainable from polycondensation of dicarboxylic acids and glycols. Examples of the dicarboxylic acids usable here are terephthalic acid, isophthalic acid, phthalic acid, 2,6-naphthalenedicarboxylic acid, adipic acid, sebacic acid, 4,4'-diphenyldicarboxylic acid, and 1,4-cyclohexyldicarboxylic acid. Examples of the glycols usable for the said polycondensation are ethylene glycol, diethylene glycol, triethylene glycol, propylene glycol, butanediol, trimethylene glycol, tetramethylene glycol, neopenty glycol, and 1,4-cyclohexanedimethanol.

Typical examples of the polyesters usable in the present invention are polyethylene terephthalate, polyethylene-2,6-naphthalate, and poly-1,4-cyclohexanedimethylene terephthalate. Polyesters obtained by copolymerizing the said acids and glycols are also usable. If necessary, the polyesters may contain other component(s) and additive(s).

In the film of the present invention, it is possible to contain the particles for the purpose of affording slipperiness to the film for facilitating its handling. As such particles, there can be used inorganic particles such as silica, calcium carbonate, magnesium carbonate, calcium phosphate, kaolin, talc, aluminum oxide, titanium oxide, alumina, barium sulfate, calcium fluoride, lithium fluoride, zeolite and molybdenum sulfide, crosslinked polymer particles, and organic particles such as calcium oxalate. In case where the film is made of a polyester, it is possible to use the particles precipitated in the polyester producing process.

The size and the content of the particles to be used are decided according to the purpose of use of the film, but as regards the average particle size, it is usually in the range from 0.005 to 5.0 μm, preferably from 0.01 to 3.0 μm. If the average particle size exceeds 5.0 μm, the film surface may become too rough and/or the particles tend to come off the film surface. On the other hand, if the average particle size is less than 0.005 μm, desired slipperiness of the film may not be obtained because of too small surface roughness. The particle content is usually 0.001 to 30.0% by weight, preferably 0.01 to 10.0% by weight, based on the polyester. When the content of particles is too large, the mechanical properties and transparency of the produced film may be deteriorated. When the content of particles is too small, the slipperiness of the film may be poor.

It is further possible to add other additives beside the said particles. Examples of such additives include antistatic agent, stabilizer, lubricant, crosslinking agent, anti-blocking agent, antioxidant, dye, pigment, light screen, and ultraviolet absorber.

The polyester film according to the present invention may be of a multi-layer structure as far as the requirements for the present invention are met, and in this case, the layer(s) other than the coated layer may not necessarily comprises a polyester.

The coating layer of the film according to the present invention is formed by applying a coating solution containing at least one binder resin (A), a polycarbodiimide compound (B) and a melamine compound (C).

In the present invention, various types of resin can be used as binder acrylic resins (A). For example, polyvinyl alcohol, polyolefins, polyamides, polyester resins, acrylic resins, and polyurethane resins can be used. Particularly polyester resins, acrylic resins and polyurethane resins are preferred for high adhesiveness and other reasons.

As the components of the polyester resin used for the coating layer, the following polyvalent carboxylic acids and polyvalent hydroxyl compounds can be exemplified. Examples of the polyvalent carboxylic acids are terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassiumsulphoterephthalic acid, 5-sodiumsulphoisophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, trimellitic acid monopotassium salt and their ester forming derivatives. The above acids may be used in combination of two or more. Exemplary of the polyvalent hydroxyl compounds are ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylene glycol, bisphenol A-ethylene glycol adduct, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, and potassium dimethylolpropionate. The above polyvalent hydroxyl compounds may be used in combination of two or more. The polyesters can be synthesized by a conventional polycondensation reaction.

Beside those mentioned above, the composite polymers having polyester components such as so-called acrylic graft polyesters disclosed in Japanese Patent Application Laid-Open (KOKAI) No. 1-165633 and polyester polyurethanes obtained by chain-lengthening polyester polyols with isocyanates are also included in the polyesters usable as a coating component in the present invention.

The acrylic resins usable as coating component in the present invention are a polymer of polymerizable monomers having carbon-carbon double bonds such as acrylic acid and methacrylic acid. The acrylic resins may be either homopolymers or copolymers. They also include the copolymers of these polymers and other polymers (polyesters, polyurethanes, etc.), for example, block copolymers and graft copolymers. They further include the polymers (in some cases, mixtures of the polymers) obtained by polymerizing acrylic monomers in a polyester solution or a polyester dispersion, the polymers (in some cases, mixtures of the polymers) obtained by polymerizing acrylic monomers in a polyurethane solution or a polyurethane dispersion, and the polymers (in some cases, mixtures of the polymers) obtained by polymerizing acrylic monomers in a polymer solution or a polymer dispersion.

The said polymerizable acrylic monomers having carbon-carbon double bonds are not specifically restricted, but the following can be mentioned as representative examples of such monomers: monomers containing various types of carboxyl groups, such as acrylic acid, methacrylic acid, crotonic acid, itaconic acid, fumaric acid, maleic acid and citraconic acid, and their salts; hydroxyl group-containing monomers such as 2-hydroxyethyl (meth)acrylate, 2-hydroxypropyl (meth)acrylate, 4-hydroxybutyl (meth)acrylate, monobutylhydroxyl fumarate, and monobutylhydroxyl itaconate; (meth)acrylic esters such as methyl (meth)acrylate, ethyl (meth)acrylate, propyl (meth)acrylate, butyl (meth)acrylate, and lauryl (meth)acrylate; nitrogen-containing vinyl monomers such as (meth)acrylamide, diacetoneacrylamide, N-methylolacrylamide and (meth)acrylonitrile. Further, the following monomers may be copolymerized with the above acrylic monomers: styrene and styrene derivatives such as α-methylstyrene, divinylbenzene and vinyltoluene; vinyl esters such as vinyl acetate and vinyl propionate; silicon-containing polymerizable monomers such as γ-methacryloxypropyltrimethoxysilane, vinyltrimethoxysilane, and Cilaplane FM-07 (methacryloylsilicone macro monomer produced by Chisso Corp.); phosphorus-containing vinyl monomers: halogenated vinyls such as vinyl chloride, vinylidene chloride, vinyl fluoride, vinylidene fluoride, trifluorochloroethylene, tetrafluoroethylene, chlorotrifluoroethylene, and hexafluoropropylene; and conjugated dienes such as butadiene.

As the polyurethane resin used as a component of the coating layer, the known polyurethanes such as disclosed in Japanese Patent Publication (KOKOKU) Nos. 42-24194, 46-7720, 46-10193 and 49-37839 and Japanese Patent Application Laid-Open (KOKAI) Nos. 50-123197, 53-126058 and 54-138098 or their homologues can be used.

For examples, polyisocyanates such as tolylene diisocyanate, phenylene diisocyanate, 4,4'-diphenylmethane diisocyanate, hexamethylene diisocyanate, xylene diisocyanate, 4,4'-dicyclohexylmethane diisocyanate and isophorone diisocyanate can be used.

Also, polyols, for example, polyetherpolyols such as polyoxyethylene glycol, polyoxypropylene glycol and polyoxytetramethylene glycol, polyesterpolyols such as polyethylene adipate, polyethylene-butylene adipate and polycaprolactone, acrylic polyols, castor oil and the like can be used. Usually, polyols having a molecular weight of 300 to 2,000 are used. Especially, use of polyesterpolyols contributes to the improvement of transparency of the coating layer and its adhesiveness to the facing.

As the chain-lengthening agent or crosslinking agent, ethylene glycol, propylene glycol, butanediol, diethylene glycol, trimethylolpropane, hydrazine, ethylenediamine, diethylenetriamine, 4,4'-diaminodiphenylmethane, 4,4'-diaminodicyclohexylmethane, water, etc., can be used.

The polycarbodiimide compound (B) used in the present invention is a compound having two or more carbodiimide groups in the molecule, which can be produced by using as main synthesizing material an organic polyisocyanate, preferably an organic diisocyanate, as for instance described in Japanese Patent Application Laid-Open (KOKAI) Nos. 10-316930 and 11-140164.

Examples of such diisocyanates are 1,3-phenylene diisocyanate, 1,4-phenylene diisocyanate, 1-methoxyphenylene-2,4-diisocyanate, 1-methylphenylene-2,4-diisocyanate, 2,4-tolylene diisocyanate, 2,6-tolylene diisocyanate, 1,3-xylylene diisocyanate, 1,4-xylylene diisocyanate, biphenylene-4,4'-diisocyanate, 3,3'-dimethoxybiphenylene-4,4'-diisocyanate, 3,3'-dimethylbiphenylene-4,4'-diisocyanate, diphenylmethane-2,4'-diisocyanate, diphenylmethane-4,4'-diisocyanate, 3,3'-dimethoxydiphenylmethane-4,4'-diisocyanate, 3,3'-dimethyldiphenylmethane-4,4'-diisocyanate, naphthylene-1,5-diisocyanate, cyclobutylene-1,3-diisocyanate, cyclopentylene-1,3-diisocyanate, cyclohexylene-1,3-diisocyanate, cyclohexylene-1,4-diisocyanate, 1-methylcyclohexylene-2,4-diisocyanate, 1-methylcyclohexylene-2,6-diisocyanate, 1-isocyanate-3,3,5-trimethyl-5-isocyanatemethylcyclohexane, cyclohexane-1,3-bis(methylisocyanate), cyclohexane-1,4-bis(methylisocyanate), isophorone diisocyanate, dicyclohexylmethane-2,4'-diisocyanate, dicyclohexylmethane-4,4'-diisocyanate, ethylene diisocyanate, 2,6-diisopropylphenyl isocyanate, tetramethylene-1,4-diisocyanate, hexamethylene diisocyanate, dodecamethylene-1,12-diisocyanate, lysine diisocyanate methyl ester, and 1,5-naphthalene diisocyanate.

One or a mixture of two or more of these organic diisocyanates can be used for producing the objective polycarbodiimide. Beside the said diisocyanates, it is also possible to use other organic polyisocyanates. Further, the monomers other than those mentioned above may be contained as a copolymer component in the molecule.

As the melamine compound (C), there can be used, for example, methoxymethylated melamine, butoxymethylated melamine and the like, which are the alkylolated or alkoxyalkylolated melamine compounds. It is also possible to use those compounds in which urea or the like is cocondensed in part of melamine.

Further, in the said coating layer, there may be contained where necessary a crosslinking-reactive compound(s) beside the compounds mentioned above. Such a crosslinking-reactive compound undergoes a crosslinking reaction mainly with the functional groups contained in the binder resin to further improve cohesiveness, surface hardness, scratch resistance, solvent resistance and water resistance of the easily adhering resin layer.

As the crosslinking-reactive compounds, epoxy compounds, isocyanate compounds and oxazoline compounds can be mentioned as typical examples.

The coating layer of the film according to the present invention may contain additives such as surfactant, defoaming agent, coating property improver, thickener, antistatic agent, organic lubricant, organic particles, inorganic particles, antioxidant, ultraviolet absorber, foaming agent, dye, pigment, etc. These additives may be used either singly or, if necessary, as a combination of two or more.

The coating solution in the present invention is preferably an aqueous solution or a water dispersion for the convenience of treatment. Water is used as main medium, but an organic solvent may be contained within limits not exceeding the claimed concept of the invention.

There are no specific restrictions on solids concentration of the coating solution in the present invention, but it is usually 0.3 to 65% by weight, preferably 0.5 to 30% by weight, more preferably 1 to 20% by weight.

Thickness of the coating layer, on dry basis, is usually 0.003 to 1.5 µm, preferably 0.005 to 0.5 µm, more preferably 0.01 to 0.3 µm. When the coating layer thickness is less than 0.003 µm, sufficient adhesion may not be obtained, and when the layer thickness exceeds 1.5 µm, film-to-film blocking tends to occur.

For forming the coating layer on the polyester film, a method is preferably used in which the coating solution is applied in course of the polyester film production process. For example, the coating solution is applied on a non-stretched film and then the coated film is stretched; the coating solution is applied on a monoaxially stretched film and then the film is further stretched; or the coating solution is applied on a biaxially stretched film and then the film is re-stretched. It is especially preferable for the economical reason to use a method in which the coating solution is applied on a non-stretched or monoaixally stretched film and then the coated film is dried and stretched simultaneously by a tenter.

For the application of the coating solution on the polyester film, various coating techniques such as shown in Y. Harasaki: Coating System, Maki Shoten, 1979, can be used. For instance, coating can be effected by using an air doctor coater, blade coater, rod coater, knife coater, squeeze coater, impregnation coater, reverse coater, transfer roll coater, gravure coater, lick roll coater, cast coater, spray coater, curtain coater, calender coater, extrusion coater or such.

According to the present invention, there is provided a film having high transparency, proof against film-to-film blocking, and showing good adherence to printing inks and various facing materials, so that the invention is of high industrial value.

EXAMPLES

The present invention is described in further detail by showing the examples thereof, but it is to be understood that these examples are merely intended to be illustrative and not to be construed as limiting the scope of the invention. The evaluation methods used in the following Examples and Comparative Examples are as explained below.

(1) Film haze

Film haze was measured according to JIS-K6714 using a integrating spere turbidimeter NDN-20H mfd. by Nippon Densyoku Industries CO., LTD., and the increase of haze to the film having no coating layer was determined. The smaller the increase of haze by provision of a coating layer to the film having no coating layer, the better the transparency of the coating layer. Transparency was judged according to the following criterion.

A: Increase of haze was less than 0.3%.
C: Increase of haze was 0.3% or more.

(2) Anti-blocking property 1

The coated side of the film and a PET film having no coat were placed one over the other and pressed under the conditions of 40° C., 80% RH, 10 kg/cm$^2$ and 20 hours (pressing time). Then, according to the method of ASTM-D-1893, the films were separated from each other and the degree of blocking was judged from the separation load and rated according to the following criterion.

A: Good. Separation load was less than 50 g.
B: Medium. Separation load was not less than 50 g and not more than 100 g.
C: Bad. Separation load was more than 100 g.

(3) Anti-blocking property 2

The films were placed one over the other with their coated sides facing each other and pressed under the conditions of 40° C., 80% RH, 10 kg/cm$^2$ and 20 hours. Then, according to the method of ASTM-D-1893, the films were separated from each other and the degree of blocking was judged from the separation load and rated according to the following criterion.

A: Good. Separation load was less than 50 g.
B: Medium. Separation load was not less than 50 g and not more than 100 g.
C: Bad. Separation load was more than 100 g.

(4) Adhesiveness 1

An ultraviolet-curing ink was applied on the coating layer of the film, and after curing the ink, its adhesiveness was judged. The test was conducted under the following conditions.

Ink: Offset ink "FD Carton P" indigo, produced by Toyo Ink Co., Ltd.

Application of ink: Ink was applied on an offset printing tester "RI Tester RI-2" (mfd. by Akira Seisakusho Ltd.) to a thickness of about 2 µm.

Curing: Ink was cured by irradiation with an UV irradiator "UVC-402/1HN:302/1MH" (mfd. by Ushio Inc.) under the conditions of: mercury lamp output=120 W/cm; line speed=15 m/min; lamp-film distance=150 mm.

Judgment of adhesiveness: An adhesive tape peel test using "Cellotape" (mfd. By NICHIBAN CO., LTD.) was conducted, and adhesion of ink was judged from the degree of separation of ink and rated according to the following criterion of the percentage of area of ink separated part to whole surface area.

A: Good. Less than 10% (No or few separation of ink occurred)
B: Medium. 10 to 90%
C: Bad. More than 90%

(5) Adhesiveness 2

A vinyl chloride/vinyl acetate copolymer resin type facing material was applied on the coating layer of the film, and after drying, its adhesiveness was judged. The test was conducted under the following conditions.

Facing: A 10 wt % solution of a vinyl chloride/vinyl acetate copolymer "VYHH" (Union Carbide Ltd.).
Solvent: MEK/toluene=1/1.
Application of facing material: The facing material was applied by "PI-1210 Auto Film Applicator" (Tester Sangyo CO., LTD.) to a thickness of about 5 µm.
Drying: Drying was conducted in a dry nitrogen atmosphere at 80° C. for 4 minutes.
Judgment of adhesiveness: An adhesive tape peel test using "Cellotape" (mfd. By NICHIBAN CO., LTD.) was conducted, and adhesiveness of the facing layer was judged from the degree of peeling of the facing and rated according to the following criterion of the percentage of area of peeling part to whole surface area.

A: Good. Less than 10%. No or few peeling occurred.
B: Medium. 10 to 90%
C: Bad. More than 90%

The compounds used as components of the coating solutions in the Examples and the Comparative Examples are listed below.

Binder resin (A1): a carboxylic acid ammonium salt water dispersion type polyester resin (Polyestar produced by Nippon Synthetic Chemical Industries Co., Ltd.)

Binder resin (A2): an acrylic resin with Tg of about 40° C. produced by copolymerizing an acrylic alkyl ester and a methacrylic alkyl ester (Nicazol produced by Nippon Carbide Industries Co., Ltd.)

Binder resin (A3): a non-yellowing polyester polyurethane (Hydran produced by Dainippon Ink and Chemicals, Inc.)

Polycarbodiimide compound (B1): a non-yellowing Polycarbodiimide (Carbodilight V-02 produced by Nisshinbo Industries, Inc)

Polycarbodiimide compound (B2): a non-yellowing polycarbodiimide (Carbodilight V-06 produced by Nisshinbo Industries, Inc)

Melamine compound (C1): an alkylolmelamine/urea co-condensate (Bechamn produced by Dainippon Ink and Chemicals, Inc.)

Inert particles (D1): silica sol having an average particle of 0.05 µm (Snowtex produced by Nissan Chemical Industries, Ltd.)

Example 1

Chips of polyethylene terephthalate having an intrinsic viscosity of 0.65 were dried well, melted by heating at 280 to 300° C., then extruded into a sheet from a T-die extruder, and cooled and solidified by attaching the sheet tightly on a polished cooling drum with a surface temperature of 40 to 50° C. by using electrostatic pinning techniques to form a non-stretched polyethylene terephthalate film. This film was stretched 3.7 times in the longitudinal direction by passing it through a group of 85° C. heated rolls to obtain a monoaxially oriented film. A water dispersion of the formulation shown in Table 1 was applied on one side of the said film, and then the film was stretched 4.0 times in the transverse direction by a tenter stretcher at 100° C. and subjected to a heat treatment at 230° C. for 3 seconds to obtain a laminated biaxially oriented polyethylene terephthalate film composed of a base film having a thickness of 50 µm and a coating layer having coating amount of 0.05 g/m$^2$.

Examples 2 to 6

The same procedure as defined in Example 1 was conducted except for a change of formulation of the coating solution as shown in Table 1 to obtain the laminated biaxially oriented polyethylene terephthalate films composed of a base film having a thickness of 50 µm and a coating layer having coating amount of 0.05 g/m$^2$.

Comparative Examples 1 to 12

The same procedure as defined in Example 1 was carried out except for a change of formulation of the coating solution as shown in Table 1 to obtain the laminated biaxially oriented polyethylene terephthalate films composed of a base film having a thickness of 50 µm and a coating layer having coating amount of 0.05 g/m$^2$.

TABLE 1

|  | Components | Weight percentage |
|---|---|---|
| Example 1 | A1/B1/C1/D1 | 75/10/10/5 |
| Example 2 | A1/B2/C1/D1 | 75/10/10/5 |
| Example 3 | A2/B1/C1/D1 | 80/5/10/5 |
| Example 4 | A2/B2/C1/D1 | 80/5/10/5 |
| Example 5 | A2/B1/C1/D1 | 75/10/10/5 |
| Example 6 | A2/B2/C1/D1 | 75/10/10/5 |
| Example 7 | A3/B1/C1/D1 | 75/10/10/5 |
| Example 8 | A3/B2/C1/D1 | 75/10/10/5 |
| Comparative Example 1 | A1/D1 | 95/5 |
| Comparative Example 2 | A1/B1/D1 | 75/20/5 |
| Comparative Example 3 | A1/B2/D1 | 75/20/5 |
| Comparative Example 4 | A1/C1/D1 | 75/20/5 |
| Comparative Example 5 | A2/D1 | 95/5 |
| Comparative Example 6 | A2/B1/D1 | 75/20/5 |
| Comparative Example 7 | A2/B2/D1 | 75/20/5 |
| Comparative Example 8 | A2/C1/D1 | 75/20/5 |
| Comparative Example 9 | A3/D1 | 95/5 |
| Comparative Example 10 | A3/B1/D1 | 75/20/5 |
| Comparative Example 11 | A3/B2/D1 | 75/20/5 |
| Comparative Example 12 | A3/C1/D1 | 75/20/5 |

Results of property evaluations of the obtained films are shown in Table 2.

TABLE 2

| | Transparency | Anti-blocking property | | Evaluation of adhesiveness | |
| --- | --- | --- | --- | --- | --- |
| | | Method 1 | Method 2 | Method 1 | Method 2 |
| Example 1 | A | A | A | A | B |
| Example 2 | A | A | A | A | A |
| Example 3 | A | A | A | A | B |
| Example 4 | A | A | A | A | A |
| Example 5 | A | A | A | A | B |
| Example 6 | A | A | A | A | A |
| Example 7 | A | A | A | A | A |
| Example 8 | A | A | A | A | A |
| Comparative Example 1 | A | C | C | C | C |
| Comparative Example 2 | C | B | C | A | B |
| Comparative Example 3 | C | B | C | A | A |
| Comparative Example 4 | A | A | B | C | C |
| Comparative Example 5 | A | B | B | A | C |
| Comparative Example 6 | C | A | B | A | B |
| Comparative Example 7 | C | A | B | A | B |
| Comparative Example 8 | A | A | A | B | C |
| Comparative Example 9 | A | B | C | B | C |
| Comparative Example 10 | C | B | C | A | B |
| Comparative Example 11 | C | B | C | A | A |
| Comparative Example 12 | A | A | A | B | B |

What is claimed is:

1. A coated film comprising a polyester film and a coating layer provided on one side thereof and having a thickness of 0.003 to 0.3 μm, wherein said coating layer is formed by applying an aqueous solution or a water dispersion containing at least one binder resin (A) selected from polyester resins, acrylic resins, and polyurethane resin; a polycarbodiimide compound (B); and a melamine compound (C); and wherein the coating layer contains organic particles, inorganic particles, or a mixture thereof.

2. A coated film according to claim 1, wherein each of said binder resin (A), polycarbodiimide compound (B) and melamine compound (C) is water soluble or water-dispersible.

3. A coated film according to claim 1, wherein the coating layer is formed by applying a coating solution containing the coating layer composing components (A), (B) and (C) on a film, then drying and stretching the film.

4. A coated film according to claim 1, wherein the ratios of the binder resin (A), polycarbodiimide compound (B) and melamine compound (C) in the coating solution are 100 parts by weight: 0.2 to 50 parts by weight: 0.2 to 50 parts by weight.

5. A coated film according to claim 1, wherein the organic particles and inorganic particles have an average particle size of 0.005 to 5.0 μm.

6. A coated film according to claim 1, wherein the content of particles in the polyester film is 0.001 to 30.0% by weight.

* * * * *